(12) United States Patent
Desai et al.

(10) Patent No.: US 7,133,939 B1
(45) Date of Patent: Nov. 7, 2006

(54) DISTRIBUTED-SERVICE ARCHITECTURE AT THE POINT OF SALE OR SERVICE

(75) Inventors: Apurva M. Desai, Fremont, CA (US); Yujian L. Wang, San Jose, CA (US); Michael Besack, Oakland, CA (US); Radha Narayanan, Santa Clara, CA (US)

(73) Assignee: Symbol Technologies, Inc., Holtsville, NY (US)

( * ) Notice: Subject to any disclaimer, the term of this patent is extended or adjusted under 35 U.S.C. 154(b) by 480 days.

(21) Appl. No.: 09/716,604

(22) Filed: Nov. 20, 2000

(51) Int. Cl.
*G06F 3/00* (2006.01)
*G06F 13/00* (2006.01)
*G06F 13/12* (2006.01)

(52) U.S. Cl. .................. 710/11; 710/62; 710/63; 710/64; 709/217; 709/223; 705/43; 707/100

(58) Field of Classification Search .............. 710/11, 710/62, 63, 64; 705/43; 707/100; 709/217, 709/223
See application file for complete search history.

(56) References Cited

U.S. PATENT DOCUMENTS

| | | | | |
|---|---|---|---|---|
| 4,859,838 | A * | 8/1989 | Okiharu | 705/22 |
| 5,742,845 | A * | 4/1998 | Wagner | 710/11 |
| 6,268,928 | B1 * | 7/2001 | Ogino | 358/1.15 |
| 6,415,341 | B1 * | 7/2002 | Fry et al. | 710/62 |
| 2001/0014881 | A1 * | 8/2001 | Drummond et al. | 705/43 |
| 2002/0055924 | A1 * | 5/2002 | Liming | 707/100 |
| 2002/0055984 | A1 * | 5/2002 | Chang et al. | 709/217 |
| 2002/0059415 | A1 * | 5/2002 | Chang et al. | 709/223 |

FOREIGN PATENT DOCUMENTS

JP 01-279362 * 9/1989

OTHER PUBLICATIONS

Microsoft Bookshelf, Microsoft Corp, 1996, Basics Edition.*
Chin, A., Re: Anyone Actually Deployed? Nov. 2, 1999, A Mailing List for Discussing Sun's Jini™ Technology, Sun Microsystems (city and country of publication unknown).
Sun Microsystems Jini Website, www.sun.com/jini (date unknown), Sun Microsystems, U.S.
OLE for Retail POS: Control Programer's Guide, Sep. 24, 2000, Release 1.5.

* cited by examiner

*Primary Examiner*—Tammara Peyton
(74) *Attorney, Agent, or Firm*—Fay Kaplun & Marcin, LLP

(57) ABSTRACT

Points of sale or service. According to various embodiment, a point of sale or service includes a register, a peripheral and a protocol converter. The protocol converter communicatively couples the register and the peripheral. The register may communicate with the protocol converter using a first protocol while the peripheral communicates with protocol converter using a second protocol. The register and the protocol converter may communicate using TCP/IP. A second peripheral may communicate with the register using the first protocol and without the aid of the protocol converter. The point of sale or service may further include a processor communicatively coupled to the protocol converter, for accessing the first peripheral.

20 Claims, 2 Drawing Sheets

DISTRIBUTED-SERVICE ARCHITECTURE AT THE POINT OF SALE OR SERVICE This invention relates to protocol converters, distributed-service architectures and point-of-sale or point-of-service (POS) terminals. More specifically, this invention relates to accessing legacy and new POS services in a POS terminal.

BACKGROUND

FIG. 1 illustrates a prior-art legacy point-of-sale (or service) terminal 100. The POS terminal 100 includes a PIN pad 110, a printer 120, a scanner 130, a signature-capture platform 140, a check reader 150, a register 160 and communications links 170, 180, 190, 1A0 and 1B0.

The links 170, 180, 190, 1A0 and 1B0 communicatively and respectively couple the PIN pad 110, the printer 120, the scanner 130, the signature-capture platform 140 and the check reader 150 to the register 160. Each link is a direct (point-to-point) connection between a peripheral and the register 160. Communications over each link follow a legacy protocol: RS485, RS232 or Universal Serial Bus (USB), for example.

Each of the peripherals 110 through 150 represents a service available to the POS terminal 100. The POS register 160 contains the intelligence to operate and coordinate the peripherals 110 through 150 in order to perform the functions of a POS terminal. The POS register 160 maintains the state of the these peripherals and also the state of any ongoing transaction.

An example of prior-art POS-register intelligence is the operating system of the model 4690 POS terminal (available from International Business Machines Corporation, Armonk, N.Y.) and its application software. The IBM model 4690 operating system runs software such as General Sales Application (GSA), Supermarket Application, Drug Store Application and Chain Sales Application, all known in the art.

(Windows-based POS registers 160 and Windows POS applications are also available. Windows is a class of operating systems available from Microsoft Corp., Bellevue, Wash.)

IBM model 4690-based POS systems have known problems. The operating system is monolithic. All peripherals that the POS system 100 is to support must be determined at the time the operating system is constructed (compiled). Adding a new service involves configuring and compiling a new version of the operating system. Adding a new service also involves acquiring application software that can take advantage of the new service.

Adding a new service requires loading the new operating systems, the new application software or both. This loading often requires the system 100 to be taken offline, thus disrupting the business of the merchant. As such, adding new services can be time consuming—even prohibitively so.

Accordingly, a point of sale or service is desirable with greater availability on the addition of peripherals or services.

These and other goals of the invention will be readily apparent to one of ordinary skill in the art on reading the background above and the description below.

SUMMARY

Herein are described points of sale or service. According to various embodiment, a point of sale or service may include a register, a peripheral and a protocol converter. The protocol converter may communicatively couple the register and the peripheral. The register may communicate with the protocol converter using a first protocol while the peripheral may communicate with the protocol converter using a second protocol. The register and the protocol converter may communicate using TCP/IP.

A second peripheral may communicate with the register using the first protocol and without the aid of the protocol converter. The point of sale or service may further include a processor communicatively coupled to the protocol converter, for accessing the first peripheral.

DESCRIPTION OF THE INVENTION

Figure 1:
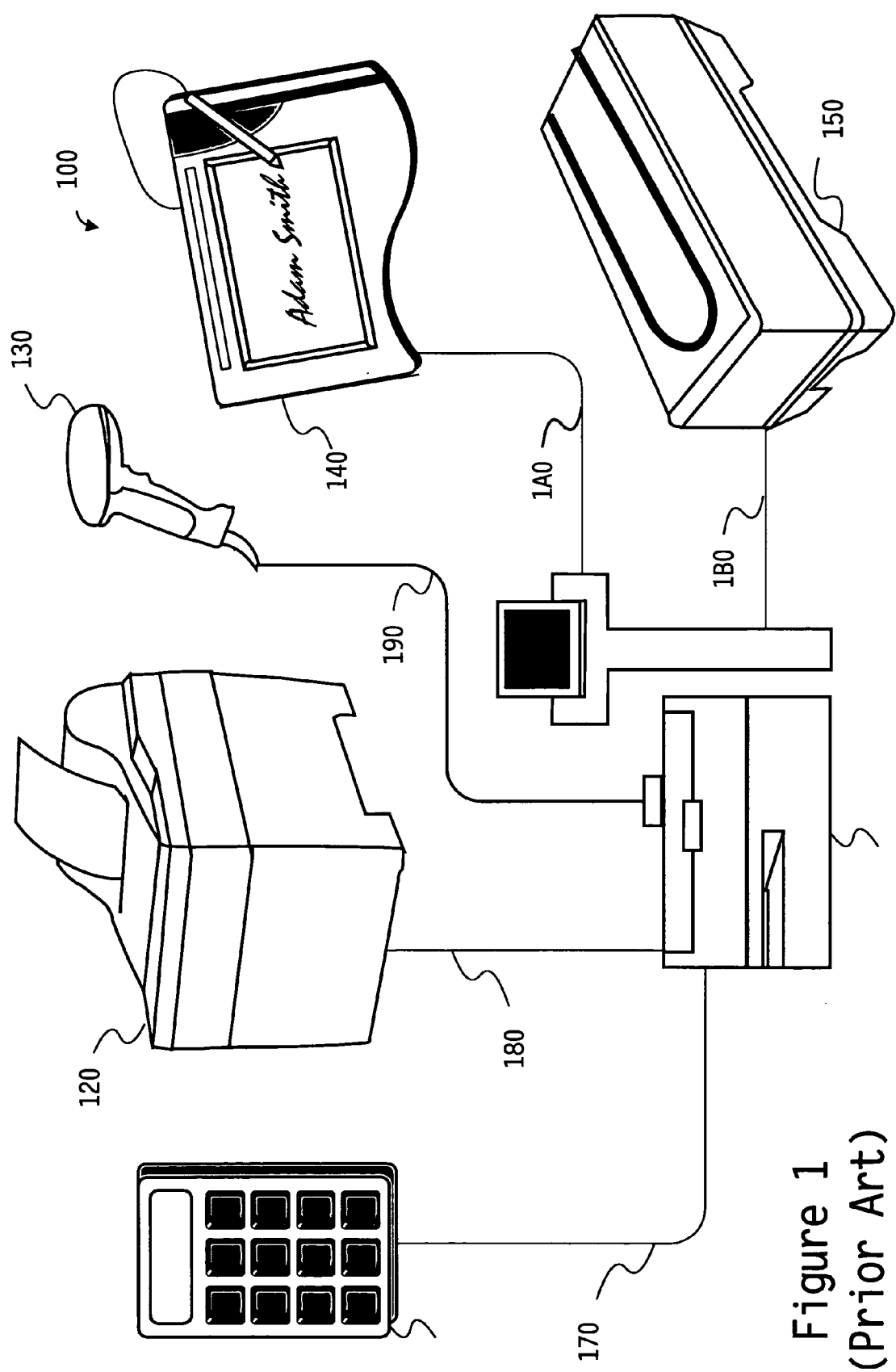
FIG. 1 illustrates a prior-art legacy point-of-sale (or service) terminal.
Figure 2:
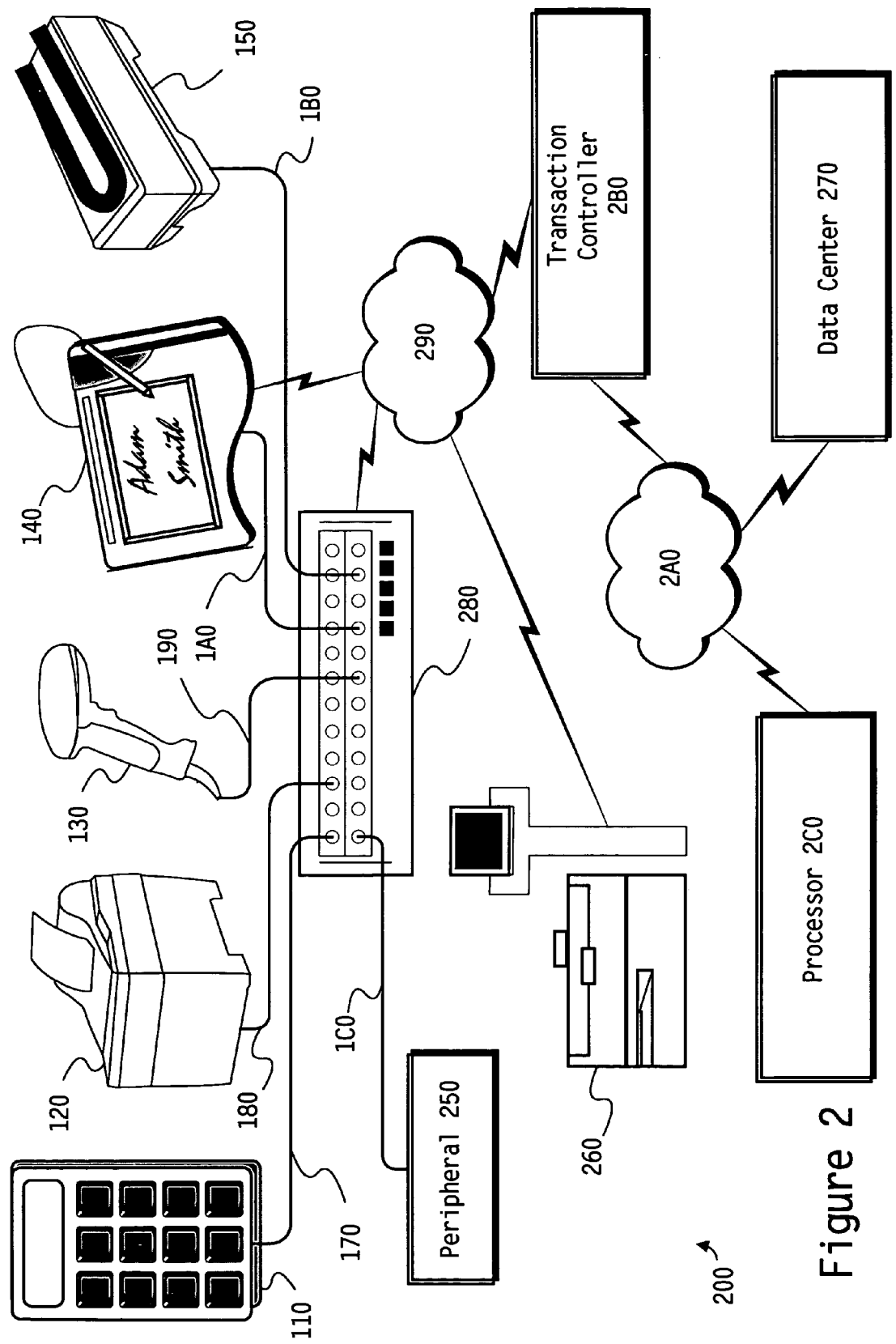
FIG. 2 illustrates a POS system incorporating an embodiment of the invention.

FIG. 2 illustrates a point-of-sale (or service) system 200 incorporating an embodiment of the invention. The POS system 200 may include one or more peripherals—here, the PIN pad 110, the printer 120, the scanner 130, the signature-capture platform 140, the check reader 150—as well as the communications links 170, 180, 190, 1A0, 1B0, all of the art. The system 200 may also include a peripheral 250, a POS register 260, a data center 270, a protocol converter 280 and communications links 290, 2A0.

The links 170, 180, 190, 1A0, 1B0 and 1C0 may communicatively and respectively connect the PIN pad 110, the printer 120, the scanner 130, the signature-capture platform 140, the check reader 150 and another peripheral 250 according to respective legacy communications protocols to the protocol converter 280. The links 170, 180, 190, 1A0, 1B0 and 1C0 are direct (point-to-point) connections.

The link 290 may communicatively interconnect the POS register 260, the protocol converter 280 and the controller 2B0. The link 290 may be an ethernet, running TCP/IP. Then the POS register 260, the protocol converter 280 and the controller 2B0 may have TCP/IP as a native communications protocol.

Indeed, any peripheral 110 through 150, 250 whose native communications protocol is the same as that of the link 290 may interconnect using the link 290 well. The signature-capture platform 140 is an example of such a peripheral.

The link 2A0 may communicatively couple the controller 2B0 and the data center 270. The link 2A0 may be an internet—even the Internet.

The protocol converter 280 may convert communications using the legacy protocols over the links 170–1C0 to communications using the protocol of the communications link 290. Example legacy protocols include RS485, RS232 and USB. The link 290 protocol may be TCP/IP, for example.

Each peripheral 110 through 150 connects to the protocol converter 280 as it connected to the POS register 160 of the prior art. The cables enabling the communications links 170, 180, 190, 1A0, 1B0 may be the same in the two POS systems 100, 200.

Any peripheral 110 through 150, 250 whose native communications protocol is the same as that of the link 290 may interconnect using the link 290 or the protocol converter 280. In such an instance, the converter 280 may work more like a repeater.

Because all of the peripherals 110 through 150, 250—and the services they provide—are accessible over the link 2A0, any processor 2C0 with access to the link 2A0 may use the services of any of the peripherals. The transaction computer 2B0 may mediate a processor 2C0's access to the peripherals 110 through 150, 250.

The POS register 260, the transaction controller 2B0, the data center 270 or some other entity on the link 290 or the link 2A0 may maintain state regarding a service or transaction. The state information that one such entity maintains may be duplicative, overlapping or disjoint from that which another such entity maintains.

In the POS system 200, the intelligence to conduct a transaction may reside in the POS register 260. The POS register 260, however, may not be intelligent enough to communicate with one or more of the peripherals. Such intelligence may now reside in any entity with access to the peripheral—the transaction computer 2B0, for example.

When a new service peripheral is added to the system 200, the operating system or application software of the POS register 260 need not be rebuilt to interact with the new peripheral. For example, the intelligence of the transaction computer 2B0 may be sufficient or may be increased to interact with the new peripheral. Accordingly, the POS register 260 need not be shut down to accommodate the new peripheral, and the transactions that the register 260 processes do not need to stop while the register is upgraded. (Of course, the POS register 260 may be upgraded in addition or in the alternative.)

In one embodiment of the system 200, a processor 2C0 or transaction computer 2B0 is programmed to interact with a new peripheral. The upgraded processor 2C0, 2B0 mediates any interaction with the new peripheral. Where, for example, the new peripheral replaces an old one and the POS register 260 continues to communicate on the expectation that the old peripheral is present, the transaction computer may filter the communications on the link 190, reading transmissions destined for the old peripheral, supplying transmissions for the new peripheral. Where the new peripheral is incapable of responding to the POS register 260 in the manner in which it expects, the transaction computer _2B0 may convert transmissions from the new peripheral for the benefit of the POS register 260.

The transaction computer 2B0 may abstract a service provided by a class of peripherals to be independent of the peripheral hardware. Say there are multiple versions of the scanner 130, each requiring different data formats. The intelligence of the transaction computer 2B0 may include a scanner interface with routines for initializing and resetting the scanner, retrieving data from the scanner, etc. Now, at the appropriate point in the transaction, the POS register 260 invokes the scanner-initialization routine on the transaction computer 2B0 and later invokes the retrieve-data routine. The transaction computer 2B0 has the entire responsibility of converting the data received as parameters to its scanner routines into data in the format required by whichever data format the scanner associated with the POS register 260 requires. (Of course, such an abstraction works as well with multiple peripherals, all communicating with the same data format.)

Using the Jini connection technology and its distributed-services paradigm, the services of a device may be further abstracted. Where, for example, the transaction computer 2B0 provides the Jini connection services, a peripheral may register with the Jini services. Later, when a processor 260, 2B0, 2C0 wants to access the peripheral's service, that processor 260, 2B0, 2C0 would query the Jini services. The Jini services return such information as necessary to allow the processor 260, 2B0, 2C0 to communicate with the peripheral. (The Jini connection technology is available from Sun Microsystems, Mountain View, Calif. Also, see www.sun.com/jini.)

The POS services that the peripherals make available may include capturing and processing signatures, reading and processing magnetic strips, displaying and processing line-item information, reading and processing personal identification numbers (PINs), processing payments, reading and processing smart-card information, recognizing and processing magnetic-ink characters (on checks, for example), printing, scanning and processing scanned information, serving advertisements and processing responses to them, serving and processing surveys, reading and processing scale information, displaying information, reading and processing biometric information, validating or verifying signatures, accessing storage (local or distributed), accessing CORBA services and providing wireless services. The preceding is by way of example and not limitation.

The invention now being fully described, many changes and modifications that can be made thereto without departing from the spirit or scope of the appended claims will be apparent to one of ordinary skill in the art. A processor 260, 2B0, 2C0 may poll a peripheral to determine whether it has any data for transmission. Alternatively, a peripheral may raise an interrupt when it is ready to transmit data. In the latter case, the system 200 becomes an event-driven transaction system.

What is claimed is:

1. A distributed service system, the system comprising:
   a register device for conducting a transaction;
   a first peripheral device configured to communicate information regarding the transaction according to a first protocol;
   a protocol converter coupled to the register device and the first peripheral device, the protocol converter configured to receive information from the first peripheral device according to the first protocol and communicate the information using TCP/IP; and
   a transaction controller coupled to the protocol converter and the register device, the transaction controller operable to facilitate communication between the register device and the protocol converter when the first peripheral device replaces a second peripheral device communicating in a second data format that is incompatible with a first data format used by the first peripheral device, wherein the register device continues to transmit data to the first peripheral device using the second data format and the first peripheral device responds to the register device using the first data format.

2. A distributed service system according to claim 1, wherein the register device is a point-of-sale (POS) terminal.

3. A distributed service system according to claim 1, wherein the first peripheral device comprises a printer.

4. A distributed service system according to claim 1, wherein the first peripheral device comprises a signature-capture platform.

5. A distributed service system according to claim 1, wherein the first peripheral device comprises a PIN pad.

6. A distributed service system according to claim 1, wherein the first peripheral device comprises a scanner.

7. A distributed service system according to claim 1, wherein the first peripheral device comprises a check reader.

8. A distributed service system according to claim 1, wherein the first protocol comprises RS485.

9. A distributed service system according to claim 1, wherein the first protocol comprises RS232.

10. A distributed service system according to claim 1, wherein the first protocol comprises USB.

11. A distributed service system according to claim 1, wherein the first protocol comprises TCP/IP.

12. A distributed service system according to claim 1, further comprises a second register device coupled to the protocol converter, the protocol converter further configured to communicate information received from the first peripheral device with the second register device.

13. A distributed service system according to claim 1, further comprising a plurality of peripheral devices coupled to the protocol converter.

14. A distributed service system according to claim 1, wherein state information regarding the transaction is stored in the transaction controller and the register device.

15. A distributed service system according to claim 1, wherein the register device, the transaction controller, and the protocol converter each comprise an Ethernet connection.

16. A distributed service system according to claim 1, wherein the transaction controller provides Jini services.

17. A distributed service system according to claim 16, wherein the first peripheral is registered with the Jini services.

18. A distributed service system according to claim 1, wherein the register device is remotely located from the first peripheral device.

19. A distributed service system according to claim 1, wherein the transaction controller is remotely located from the peripheral device.

20. A method for operating a distributed service system, the method comprising:

operating a register device for conducting a transaction at a first location;

operating a first peripheral device configured to communicate information regarding the transaction according to a first protocol;

operating a remotely located protocol converter coupled to the register device and the first peripheral device by a TCP/IP communication link, the protocol converter configured to receive information from the first peripheral device according to the first protocol and communicate the information using TCP/IP; and operating a transaction controller remotely located from said register device and coupled to the protocol converter and the register device, the transaction controller operable to facilitate communication between the register device and the protocol converter when the first peripheral device replaces a second peripheral device communicating in a second data format that is incompatible with a first data format used by the first peripheral device, wherein the register device continues to transmit data to the first peripheral device using the second data format and the first peripheral device responds to the register device using the first data format.

* * * * *